United States Patent
Tsunekawa

(10) Patent No.: US 7,234,578 B2
(45) Date of Patent: Jun. 26, 2007

(54) TORQUE CONVERTER

(75) Inventor: Kazutoshi Tsunekawa, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 182 days.

(21) Appl. No.: 11/108,830

(22) Filed: Apr. 19, 2005

(65) Prior Publication Data

US 2005/0230207 A1  Oct. 20, 2005

(30) Foreign Application Priority Data

Apr. 20, 2004 (JP) .............................. 2004-124772

(51) Int. Cl.
*F16H 61/14* (2006.01)
(52) U.S. Cl. ..................... 192/3.3; 477/62; 701/67
(58) Field of Classification Search ..................... None
See application file for complete search history.

(56) References Cited

U.S. PATENT DOCUMENTS 5,893,438 A * 4/1999 Hasegawa et al. ........... 192/3.3
6,050,919 A * 4/2000 Kusafuka et al. ........... 477/169

2002/0040622 A1* 4/2002 Tsunekawa et al. ........ 74/732.1
2004/0029672 A1* 2/2004 Tsunekawa et al. ........... 475/65

FOREIGN PATENT DOCUMENTS

| JP | 5-187541 A | * 7/1993 |
| JP | 7-113409 | 5/1995 |
| JP | 2001-116138 | 4/2001 |
| JP | 2001-271906 | 10/2001 |

\* cited by examiner

*Primary Examiner*—Rodney H. Bonck
(74) *Attorney, Agent, or Firm*—Buchanan Ingersoll & Rooney PC

(57) ABSTRACT

A lock-up clutch controlling device includes a three-dimensional back pressure map, a sensor, and a lock-up pressure controlling unit. The map allows a back pressure of a lock-up piston to be determined from a rotational speed of an engine, an oil temperature, and a speed ratio. The sensor is provided for a parameter influencing the back pressure of the piston. The lock-up pressure controlling unit determines a value equivalent to the back pressure of the lock-up piston from an input value of the sensor and the hydraulic pressure map, and outputs a lock-up pressure to be applied to a lock-up clutch by using the value equivalent to the back pressure of the lock-up piston. When the controlling device operates, it outputs the lock-up pressure by using the value equivalent to the back pressure of the lock-up piston.

16 Claims, 8 Drawing Sheets

TORQUE CONVERTER

This application is based on and claims priority under 35 U.S.C. § 119 to Japanese Patent Application 2004-124772, filed on Apr. 20, 2004, the entire content of which is incorporated herein by reference.

BACKGROUND OF THE INVENTION

1. Field of the Invention

The present invention relates to a torque converter including a controlling device for a lock-up clutch capable of direct power transmission between an input side and an output side, and, more particularly, to a torque converter which controls a power transmission capacity (engagement capability of the lock-up clutch) in accordance with, for example, a running state of a vehicle.

2. Description of the Related Art

Various types of technologies have been proposed for preventing variations in an engagement time or generation of shock when a lock-up clutch is engaged in accordance with the state of a vehicle, in controlling the hydraulic pressure of the lock-up clutch. For example, Japanese Examined Patent Application Publication No. 7-113409 and Japanese Unexamined Patent Application Publication No. 2001-116138 each disclose a lock-up clutch hydraulic controlling device which feeds back the internal pressure of a torque converter chamber to a pressure control valve and adds a bias equivalent to the internal pressure of the torque converter to the hydraulic pressure of a lock-up clutch. In addition, for example, Japanese Unexamined Patent Application Publication No. 2001-271906 discloses a technology in which a conduction pipe bypassing an inlet flow path and an outlet flow path of, for example, a torque converter is disposed, a pressure sensor is disposed at an intermediate portion of the conduction pipe, the internal pressure of the torque converter chamber is estimated, and the estimated value is used for controlling the lock-up hydraulic pressure.

In particular, when performing a slip control operation on a lock-up clutch at a target slip amount, in order to eliminate the effect of a difference between the time that a fluid pressure is supplied and the time that the lock-up clutch actually operates, it is desirable to perform, for example, a pre-charge control operation before a lock-up piston (hereafter referred to as "piston") operates. Here, it is necessary to precisely determine the back pressure of the piston (that is, the pressure acting in a direction opposing the direction of operation of the piston) and to reflect the determined back pressure in the lock-up pressure. However, it is difficult to precisely detect and predict the back pressure of the piston in an actual vehicle.

The aforementioned related technologies focus attention on the fact that the internal pressure of the torque converter acts upon the back side of the piston. With the internal pressure being assumed as being equivalent to the back pressure of the piston, inlet and outlet flow paths of the torque converter communicate with a lock-up pressure regulating valve in order to feed back the internal pressure of the torque converter. FIG. 8 is a hydraulic circuit diagram of a lock-up controlling device for the torque converter, disclosed in Japanese Unexamined Patent Application Publication No. 2001-116138. In FIG. 8, an inlet pressure and an outlet pressure of the torque converter are made to act upon a valve 22 for producing a lock-up control pressure.

As correctly pointed out in the related art, the inlet pressure and the outlet pressure of the torque converter do greatly vary with the temperature of an operating fluid and the rotation of a turbine. Strictly speaking, for example, the structure of and the flow in a hydraulic path and centrifugal hydraulic pressure affect the back pressure of the piston. FIG. 9 shows a graph of the results of actual measurements of the back pressure of a piston and an inlet pressure and an outlet pressure (T/C in and T/C out) of a torque converter in terms of different rotational speeds Nt of a turbine. Whereas the inlet pressure and the outlet pressure of the torque converter increase as the rotational speed Nt increases, the back pressure at 3000 rpm is less than the back pressure at 2000 rpm. Therefore, in the method that makes use of the inlet pressure and the outlet pressure of the torque converter, feedback is sometimes not properly performed.

For example, in the technology disclosed in Japanese Examined Patent Application Publication No. 7-113409, the internal pressure of the torque converter is fed back, and the hysteresis occurring when the lock-up pressure increases or decreases is relatively large. Therefore, this technology is not suitable for continuously performing slip control operations at target rotational speeds.

In addition, for example, in the technology disclosed in Japanese Unexamined Patent Application Publication No. 2001-271906, due to, for example, the effects of the structure of and flow in the hydraulic path, a highly precise back pressure cannot be obtained on the basis of an estimated internal pressure of the torque converter. Even if the estimated value is used in fine controlling of the lock-up pressure in accordance with the state of a vehicle, a shock is produced when piston contact occurs.

SUMMARY OF THE INVENTION

Accordingly, in view of the above-described problems, it is an object of the present invention to provide a lock-up clutch controlling device which can finely control a lock-up hydraulic pressure in accordance with variations in the back pressure of a piston.

To this end, according to a first aspect of the present invention, there is provided a torque converter including a pump vane wheel connected so as to be rotatable with an output shaft of an engine of a vehicle, a turbine vane wheel connected so as to be rotatable with an input shaft of a transmission, a stator vane wheel secured to a housing of the transmission via a one-way clutch, a lock-up clutch mechanism which operates so as to control a slip amount of the turbine vane wheel and the pump vane wheel in accordance with a fluid pressure applied to a piston chamber of the lock-up mechanism, a hydraulic pressure map defining the relationship between a parameter which influences a back pressure of a lock-up piston of the lock-up clutch mechanism and the back pressure of the lock-up piston, a sensor for measuring the parameter which influences the back pressure of the lock-up piston, and a lock-up pressure controlling unit for determining a value equivalent to the back pressure of the lock-up piston from the hydraulic pressure map and the parameter measured by the sensor and, the lock-up pressure controlling unit outputting a lock-up pressure to be applied to the piston chamber by compensating the value equivalent to the back pressure of the lock-up piston.

The lock-up pressure controlling unit includes a program for execution by a computer constituting an EPU and a hydraulic pressure control circuit. According to a second aspect of the present invention, the lock-up pressure controlling unit includes a hydraulic control circuit and a program in correspondence with processing means, that is, back pressure equivalent value calculating means for determining a value equivalent to the back pressure of the lock-up piston from a parameter value which influences the back pressure of the lock-up piston, net transmission capacity calculating means for calculating a net transmission capacity in accordance with a running state of the vehicle, and lock-up pressure controlling means for performing a control operation so that the sum of an output value of the back pressure equivalent value calculating means and an output value of the net transmission capacity calculating means is applied as a lock-up pressure to the lock-up clutch mechanism.

According to the present invention, it is possible to perform a fine lock-up control operation in accordance with the back pressure of the piston varying with various running states of the vehicle.

DESCRIPTION OF THE PREFERRED EMBODIMENTS

Figure 1:
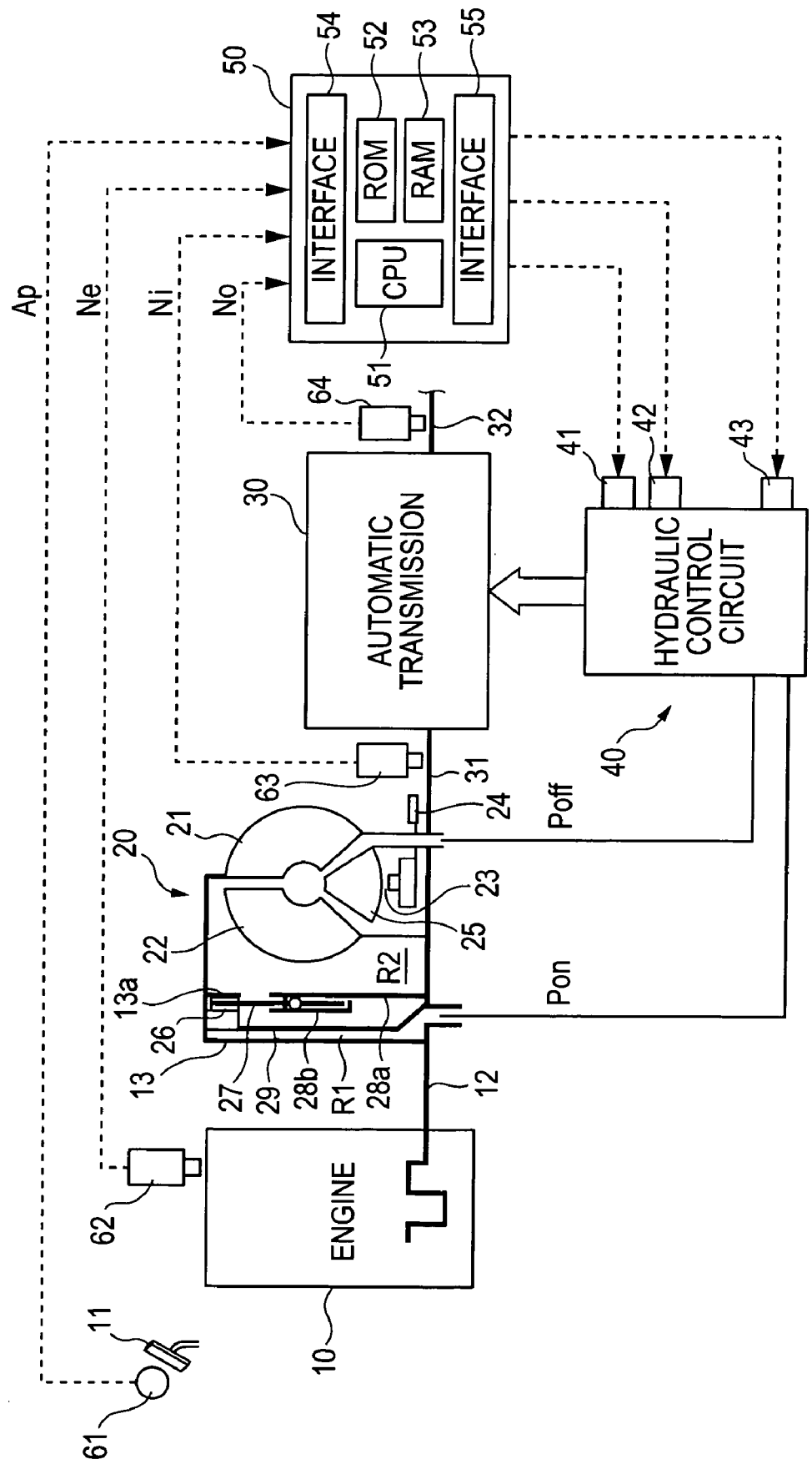
FIG. 1 is a schematic view of a vehicle including a lock-up clutch controlling device in accordance with an embodiment of the present invention.

An embodiment of the present invention will be described in detail with reference to the drawings. FIG. 1 is a schematic view of a vehicle including a lock-up clutch controlling device in accordance with an embodiment of the present invention. Referring to FIG. 1, the vehicle according to the embodiment includes an engine 10, a torque converter 20 with a lock-up clutch, an automatic transmission 30, a hydraulic control circuit 40 for controlling the hydraulic pressure applied to the automatic transmission 30 and a lock-up clutch mechanism, and an electronic controlling unit 50 for transmitting a control command signal to the hydraulic control circuit 40.

An output of the engine 10 can be increased and decreased by operating an accelerator pedal 11, and is transmitted to the torque converter 20 and the automatic transmission 30 and to a drive wheel via a differential (not shown).

The torque converter 20 broadly includes a fluid transmission mechanism and the lock-up clutch mechanism connected in parallel with the fluid transmission mechanism. The fluid transmission mechanism includes a pump vane wheel 21, a turbine vane wheel 22, and a stator vane wheel 25. The pump vane wheel 21 is connected to a crank shaft 12 of the engine 10 via a connecting member 13 including, for example, the front cover of the torque converter 20. The turbine vane wheel 22 is secured to an input shaft 31 of the automatic transmission 30 and rotates by receiving oil from the pump vane wheel 21. The stator vane wheel 25 is secured to a housing 24 via a one-way clutch 23.

The automatic transmission 30 includes an input shaft 31 and an output shaft 32 connected to a drive wheel via, for example, a differential and a drive wheel of the vehicle. The automatic transmission 30 provides a plurality of transmission stages in accordance with a combination of engagement and disengagement of a plurality of frictional engaging elements.

The hydraulic control circuit 40 includes a first electromagnetic valve 41, a second electromagnetic valve 42, and a third electromagnetic valve 43, which are subjected to ON-OFF driving by signals from the electronic controlling unit 50. The first electromagnetic valve 41 and the second electromagnetic valve 42 selectively control the engagement and disengagement of the frictional engaging elements of the automatic transmission 30 at a predetermined pressure, and the third electromagnetic valve 43 adjusts hydraulic pressures Pon and Poff applied to an engagement oil chamber R1 (piston chamber, torque converter chamber) and a disengagement oil chamber R2, which are torque converter chambers, in order to control the engagement and disengagement of a lock-up clutch 26. More specifically, as described in detail later, the third electromagnetic valve 43 is a solenoid driving type electromagnetic valve in which a ratio between an ON time and an OFF time (duty ratio) is controlled by the signal from the electronic controlling unit 50. The third electromagnetic valve 43 controls a line pressure via a lock-up pressure control valve (described later) and applies it to the engagement oil chamber R1 (piston chamber, torque converter chamber). The hydraulic control circuit 40 adjusts an engagement pressure of the lock-up clutch 26 by an application of a constant hydraulic pressure to the disengagement oil chamber R2 when the duty ratio is controlled in the third electromagnetic valve 43 or by an application of a drain pressure to the disengagement oil chamber R2 when the duty ratio is not controlled in the third electromagnetic valve 43.

The electronic controlling unit 50 is a microcomputer including, for example, a central processing unit (CPU) 51, a read only memory (ROM) 52, a random access memory (RAM) 53, and interfaces 54 and 55. The electronic controlling unit 50 is connected to an accelerator opening sensor 61 for detecting the opening of an accelerator 11, an engine rotational speed sensor 62 for detecting the rotational speed of the engine 10, an input shaft rotational speed sensor 63 for detecting the rotational speed of the input shaft 31 of the automatic transmission 30, and an output shaft rotational speed sensor 64 for detecting the rotational speed of the output shaft 32 of the automatic transmission 30. The opening of the accelerator 11 is a parameter which influences the back pressure of a lock-up piston. A signal indicating an accelerator opening Ap, a signal indicating a rotational speed Ne of the engine (equivalent to the rotational speed of the pump vane wheel 21), a signal indicating an input shaft rotational speed Ni (equivalent to the rotational speed Nt of the turbine vane wheel 22), and a signal indicating an output shaft rotational speed No are measured and are then input to the electronic controlling unit 50 from the respective sensors through the interface 54.

The CPU 51 of the electronic controlling unit 50 processes the various input signals in accordance with a program stored in the ROM 52, and, as necessary, makes use of the RAM 53 in order to control the speed change of the automatic transmission 30 and the engagement operation of the lock-up clutch 26 by sending signals for controlling the driving of the first to third electromagnetic valves 41, 42, and 43 via the interface 55.

Figure 2:
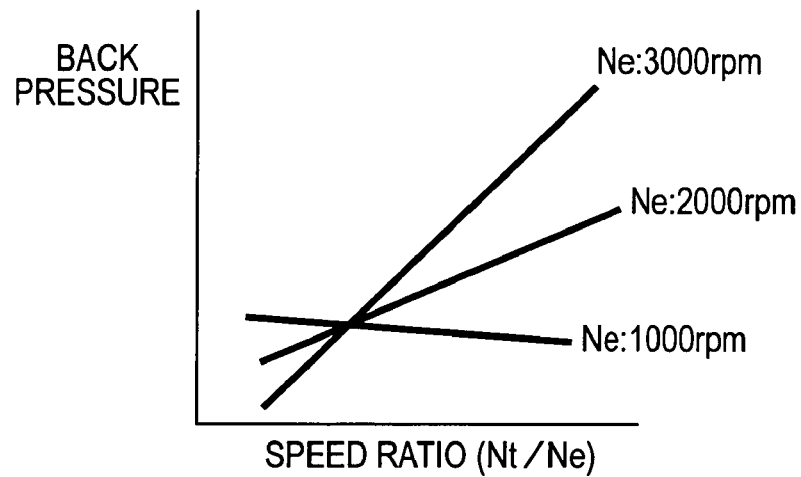
FIG. 2 shows a general back pressure map used in the present invention.

A back pressure map, a map regarding the operating area of a lock-up mechanism, and maps for determining the transmission capacity (that is, the map regarding the lock-up pressure during speed change and the map regarding the lock-up pressure when starting a slip control operation) are stored in ROM 52 of the electronic controlling unit 50. FIG. 2 shows a general back pressure map, with the horizontal axis representing the speed ratio (that is, the turbine rotational speed Nt/the engine rotational speed Ne) and the vertical axis representing the back pressure. The back pressures for a MAX product, a standard product, and a MIN product were experimentally determined and were mapped at respective rotational speeds of the engine (1000 rpm, 2000 rpm, and 3000 rpm in FIG. 2). Using this back pressure map, a back pressure equivalent to the back pressure in an actual vehicle can be determined from the speed ratio and the rotational speed of the engine. Hereunder, the embodiment will be described assuming that the ROM 52 stores a three-dimensional back pressure map which is produced by adding an oil temperature axis to the back pressure map (shown in FIG. 2) and which allows a back pressure to be determined from the oil temperature, the speed ratio, and the rotational speed of the engine by performing actual measurements at an actual vehicle.

Figure 3:
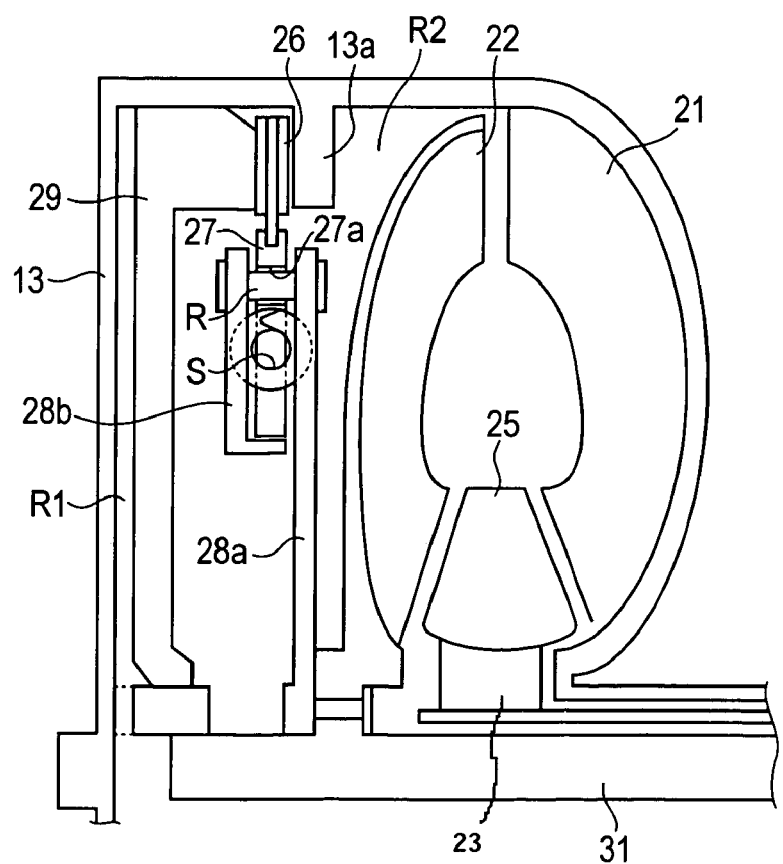
FIG. 3 is a schematic view of the structure of a lock-up clutch mechanism.

The structure of the lock-up clutch mechanism will be described. FIG. 3 is a schematic view of the structure of the lock-up clutch mechanism. Referring to FIG. 3, the lock-up clutch mechanism includes the lock-up clutch 26, an annular drive plate 27, a clutch opposing portion 13a, a first driven plate 28a, a second driven plate 28b, a lock-up piston 29, and a plurality of coil springs S. The lock-up clutch 26 is an annular plate, is held so as to be movable axially, and has frictional members on both surfaces thereof. The drive plate 27 is secured to the inner side of the lock-up clutch 26 in a radial direction. The clutch opposing portion 13a is integrally formed with the connecting member 13 so as to oppose the lock-up clutch 26. The first driven plate 28a is secured to the input shaft 31 so as to rotate together with the input shaft 31 of the automatic transmission 30. The second driven plate 28b is annular and is secured to the first driven plate 28a with a rivet R. The lock-up piston 29 is movable axially and pushes the lock-up clutch 26 against the clutch opposing portion 13a.

The coil springs S include damper mechanisms for absorbing vibration, and are held in long holes formed in appropriate locations of the first and second driven plates 28a and 28b in the circumferential direction. When a twist angle is formed between the drive plate 27 (lock-up clutch 26) and the first driven plate 28a (second driven plate 28b), a resilient force is applied between the drive plate 27 and the first driven plate 28a.

When the hydraulic pressure in the engagement oil chamber R1 (piston chamber, torque converter chamber) (defined by the lock-up piston 29 and the connecting member 13) becomes greater than the hydraulic pressure in the disengagement oil chamber R2 (defined by the lock-up clutch 26, the clutch opposing portion 13a, the first driven plate 28a, etc.), the lock-up piston 29 pushes the lock-up clutch 26 towards the clutch opposing portion 13a and engages the lock-up clutch 26 with the clutch opposing portion 13a. In contrast, when the hydraulic pressure in the disengagement oil chamber R2 becomes greater than the hydraulic pressure in the engagement oil chamber R1 (piston chamber, torque converter chamber), the lock-up piston 29 moves the lock-up clutch 26 away from the clutch opposing portion 13a and disengages the lock-up clutch 26 and the clutch opposing portion 13a from each other.

Figure 4:
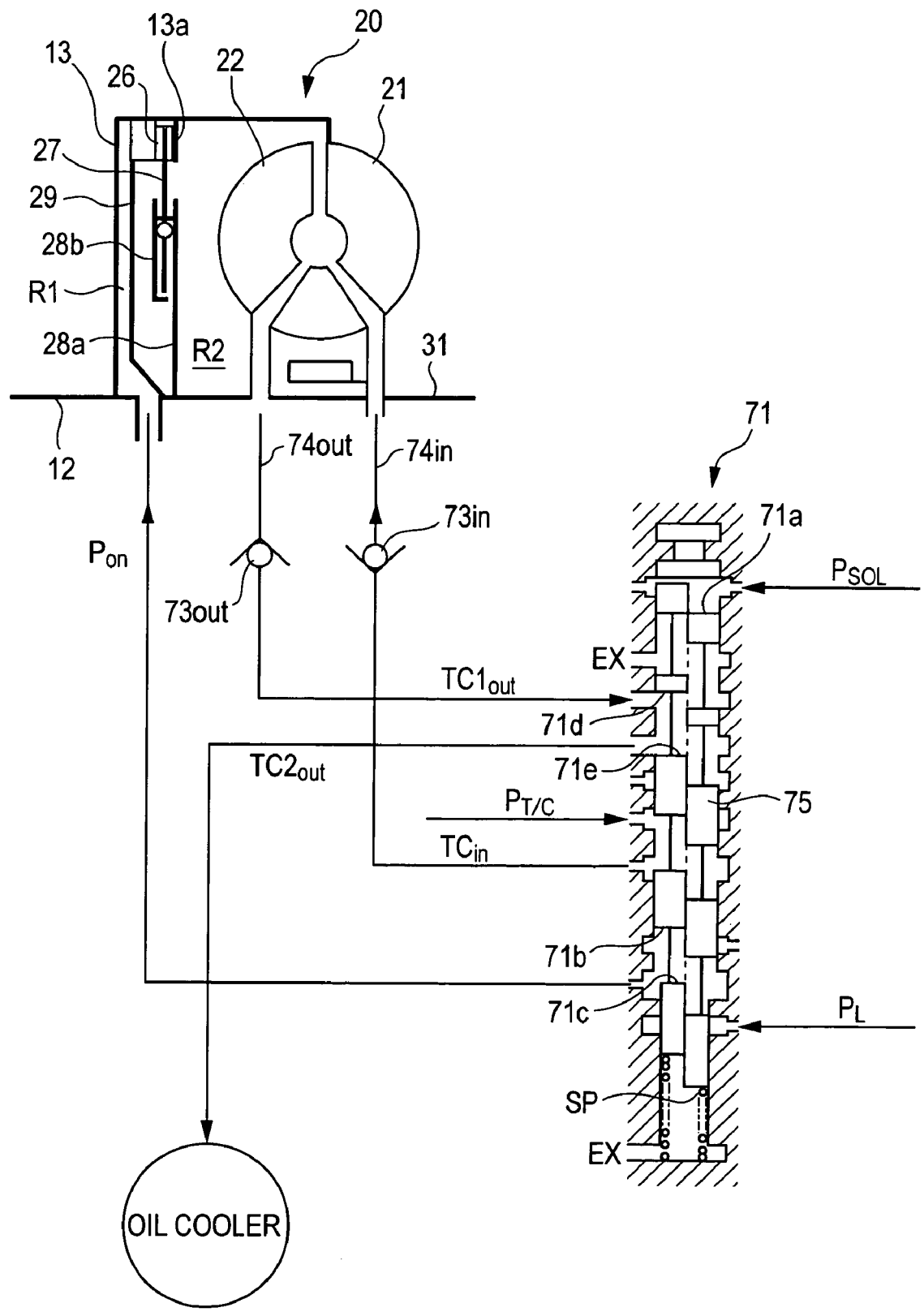
FIG. 4 is a hydraulic circuit diagram schematically showing a lock-up control circuit in accordance with the embodiment of the present invention.

FIG. 4 is a hydraulic circuit diagram schematically showing a lock-up control circuit for operating the lock-up piston 29. Referring to FIG. 4, a control pressure PSOL generated from an ON-OFF solenoid (not shown), a return pressure $TC1_{out}$ generated from the torque converter via a torque converter inlet-outlet oil path 74out and a check valve (reverse flow prevention valve) 73out, $P_{T/C}$ of an input hydraulic power source to the torque converter, and a line pressure $P_L$ are input to a valve 71 in that order from the upper side to the lower side in FIG. 4. A discharge EX to a drain, a discharge $TC2_{out}$ to an oil cooler, an input pressure $TC_{IN}$ applied to the torque converter through a check valve (reverse flow prevention valve) 73in and a torque converter inlet-outlet oil path 74in, and a control pressure $P_{on}$ for the lock-up clutch are output from the valve 71 in that order from the upper side to the lower side in FIG. 4.

A spool 75 for switching between the oil paths is disposed in the valve 71. In FIG. 4, the right half shows a state in which the spool 75 is disposed at its lower position and the lock-up pressure $P_{on}$ is output from the valve 71, whereas the left half shows a state in which the spool 75 is disposed at its upper position and neither the line pressure $P_L$ nor the lock-up pressure $P_{on}$ are output. When the spool 75 is disposed at its upper position, that is, when the lock-up pressure $P_{on}$ is not output, the return pressure $TC1_{out}$ from the torque converter is applied through a port of the valve 71 and becomes the discharge $TC2_{out}$ to the oil cooler. In contrast, when the spool 75 is disposed at its lower position, that is, when the lock-up pressure $P_{on}$ is output, the return pressure $TC1_{out}$ from the torque converter is discharged to the drain from the location of EX. This is because, when the lock-up clutch operates, that is, when the lock-up pressure $P_{on}$ is output, the output from the disengagement oil chamber R2 is reduced, so that variations in the pressure in the disengagement oil chamber R2 is minimized. In order to obtain the predetermined lock-up pressure $P_{on}$, $P_{SOL}$ which balances forces acting on the spool of the valve 71 is determined by the following Formula (1) and is made to act upon a step 71a of the valve:

$$P_{SOL} \cdot A = SP + P_{on} \cdot C \tag{1}$$

Here, A represents a pressure receiving area of the step 71a of the spool, and C represents the difference between the area of a step 71b and the area of a step 71c. Since the pressure receiving areas of steps 71d and 71e at the central portion of the spool are the same, they do not have to be considered. When Formula (1) is modified, it becomes as follows:

$$P_{on} = \frac{P_{SOL} \cdot A - SP}{C} \tag{2}$$

Figure 5:
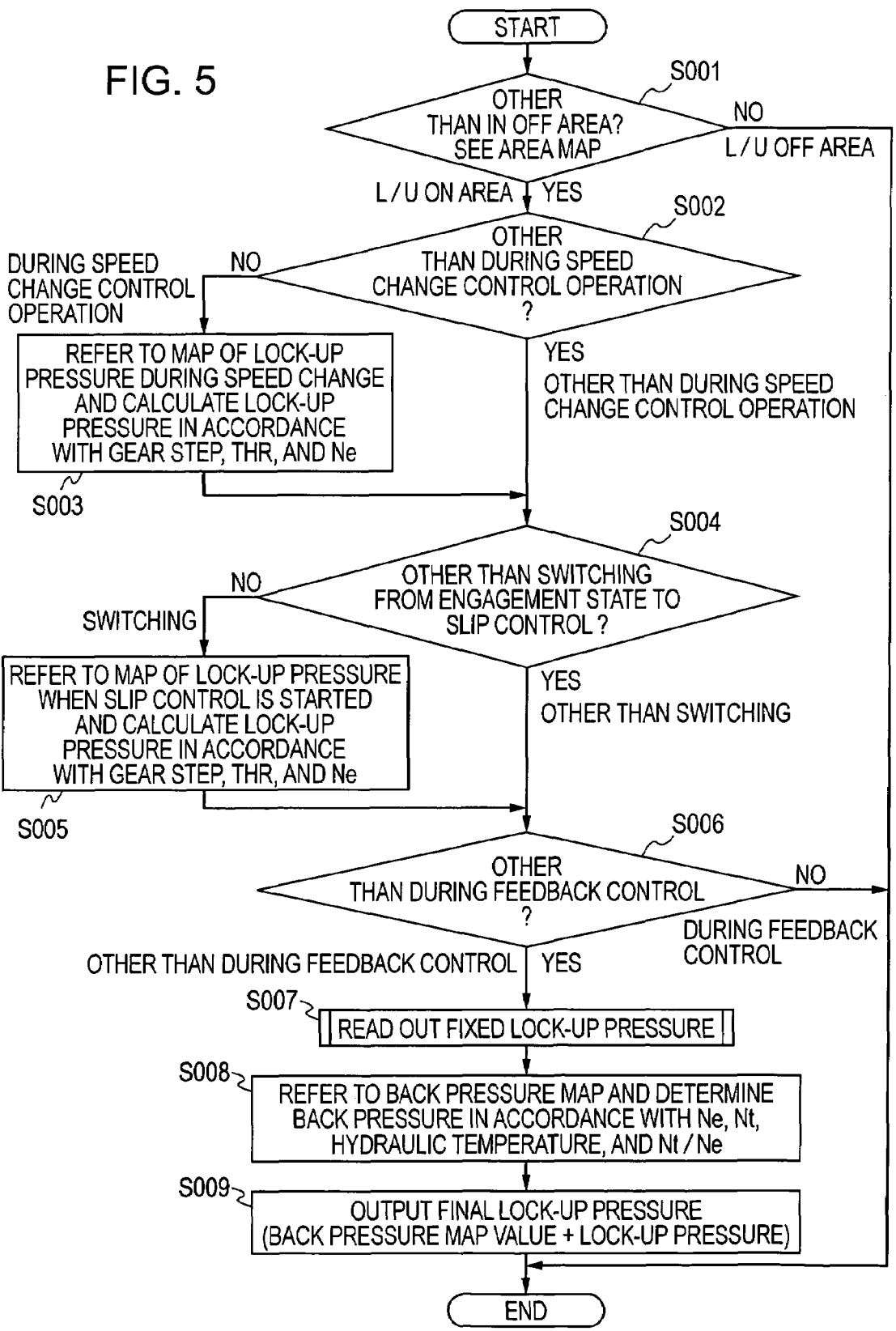
FIG. 5 is a flowchart of the steps of a lock-up control operation.

The control of the lock-up clutch mechanism will be described in detail with reference to FIG. 5. FIG. 5 is a flowchart of the steps of a lock-up control operation. The CPU 51 of the electronic controlling device 50 executes each processing step illustrated in FIG. 5 each time a predetermined period of time elapses. In Step S001, the CPU 51 refers to the area map in which the operating area of the lock-up clutch mechanism is defined by the speed of the vehicle and the opening of the accelerator, and determines whether the lock-up setting is on or off. Here, if the CPU 51 determines that lock-up is not to be performed, the processing in this cycle of steps ends.

If, in Step S001, the CPU 51 determines that the lock-up clutch 26 is to be operated, such as, for example, when the speed of the vehicle is equal to or greater than a predetermined value A2 (engagement control required) or the speed of the vehicle is equal to or greater than a predetermined value A1 and less than A2 and the opening of the accelerator is equal to or less than a predetermined value (slip control required), the CPU 51 determines whether speed change of the vehicle is being controlled in Step S002. If the speed change of the vehicle is being controlled, the CPU 51 refers to the map regarding the lock-up pressure during the speed change stored in the ROM 52 and calculates the lock-up pressure (value prior to adding a value equivalent to the back pressure) of the transmission capacity that is minimally required for eliminating backlash of the vehicle after completing the speed change in accordance with a gear step, an oil temperature THR, the rotational speed Ne of the engine, etc., in Step S003.

Next, in Step S004, the CPU 51 determines whether the vehicle state should be switched from the engagement state of the lock-up clutch 26 to the slip control state. Here, when the change in speed of the vehicle is being controlled, the CPU 51 refers to the map regarding the lock-up pressure when the slip control is started stored in the ROM 52, and calculates the lock-up pressure (value prior to adding a value equivalent to the back pressure) of the transmission capacity that is minimally required in accordance with a gear step, the oil temperature THR, the rotational speed Ne of the engine, etc., in Step S005.

Next, in Step S006, the CPU 51 determines whether or not feedback control is being carried out on the basis of a slip amount (that is, the difference between the rotational speed Ne of the engine and the rotational speed Nt of the turbine vane wheel). Here, when the CPU 51 determines that the feedback control is being carried out, the processing of this cycle of steps ends. During the feedback control, the controlling of the processing of a feedback system, such as the slip control carried out so as to achieve a target slip rotational speed and the determination to allow engagement, is carried out.

If, in Step S006, the CPU 51 determines that the feedback control is not being carried out, and that, for example, a pre-charge control operation, a shelf control operation, or an engagement control operation is to be carried out, the CPU 51 sets a pre-charge pressure, a shelf pressure, or a predetermined hydraulic pressure value (which is set as an engagement pressure and corresponds to lock-up pressure prior to adding the parameter corresponding to the back pressure) in Step S007. All of the pressure values are stored in the ROM 52.

Next, in Step S008, the CPU 51 refers to the back pressure map stored in ROM 52, and determines a value equivalent to the back pressure of the piston in accordance with the rotational speed Ne of the engine, the rotational speed Nt of the turbine vane wheel, the oil temperature THR, and the speed ratio (that is, the turbine rotational speed Nt/the engine rotational speed Ne).

Figure 6:
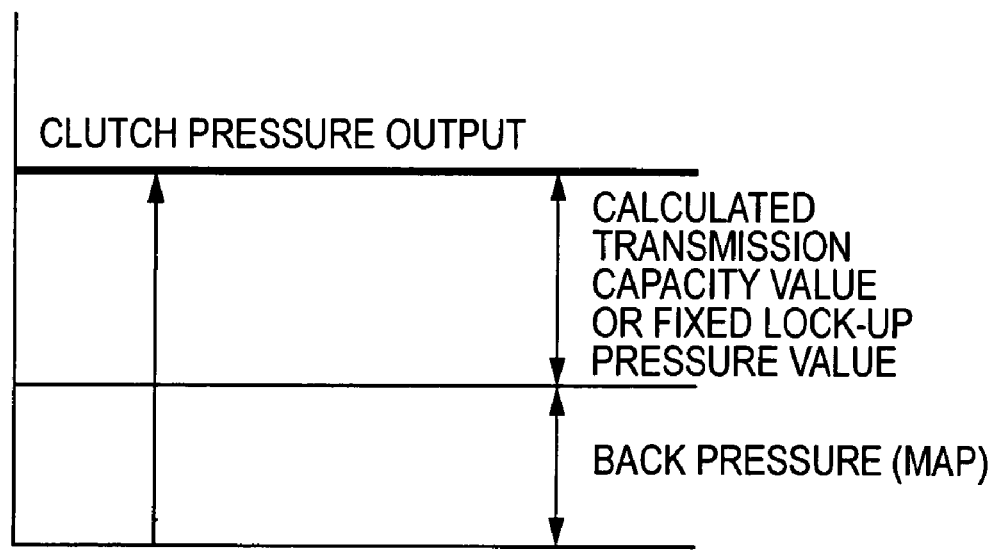
FIG. 6 schematically shows the components of an output lock-up pressure in accordance with the present invention.

Next, in Step S009, the CPU 51 adds a fixed hydraulic pressure (lock-up pressure prior to adding the value equivalent to the back pressure) or the calculated transmission capacity value (lock-up pressure prior to adding the value equivalent to the back pressure) and the value corresponding to the back pressure of the piston determined in Step S008, and outputs the sum as a lock-up pressure illustrated in the conceptual diagram of FIG. 6.

Figure 7:
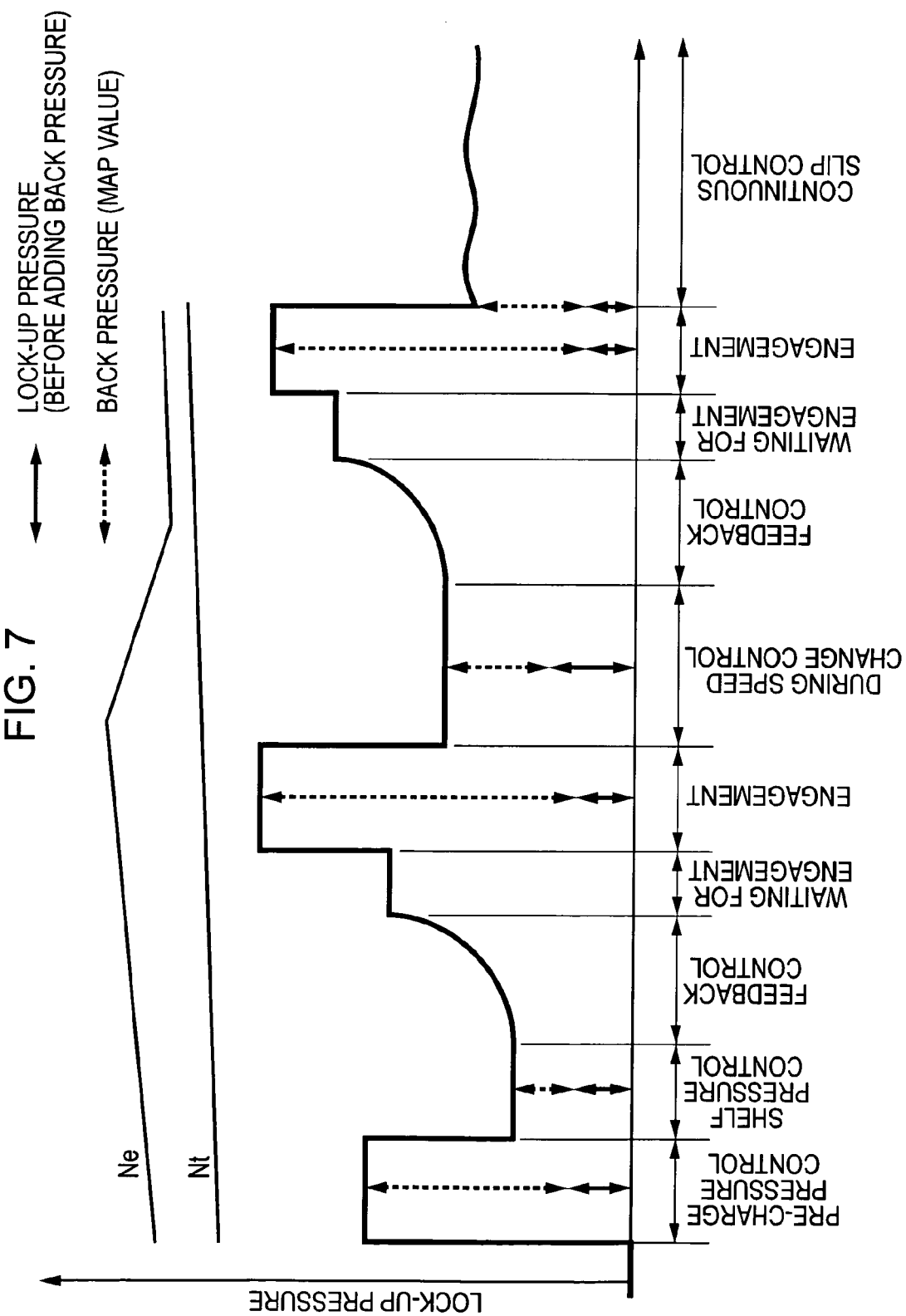
FIG. 7 shows the waveform of the lock-up pressure that has been output by the application of the present invention.
Figure 8:
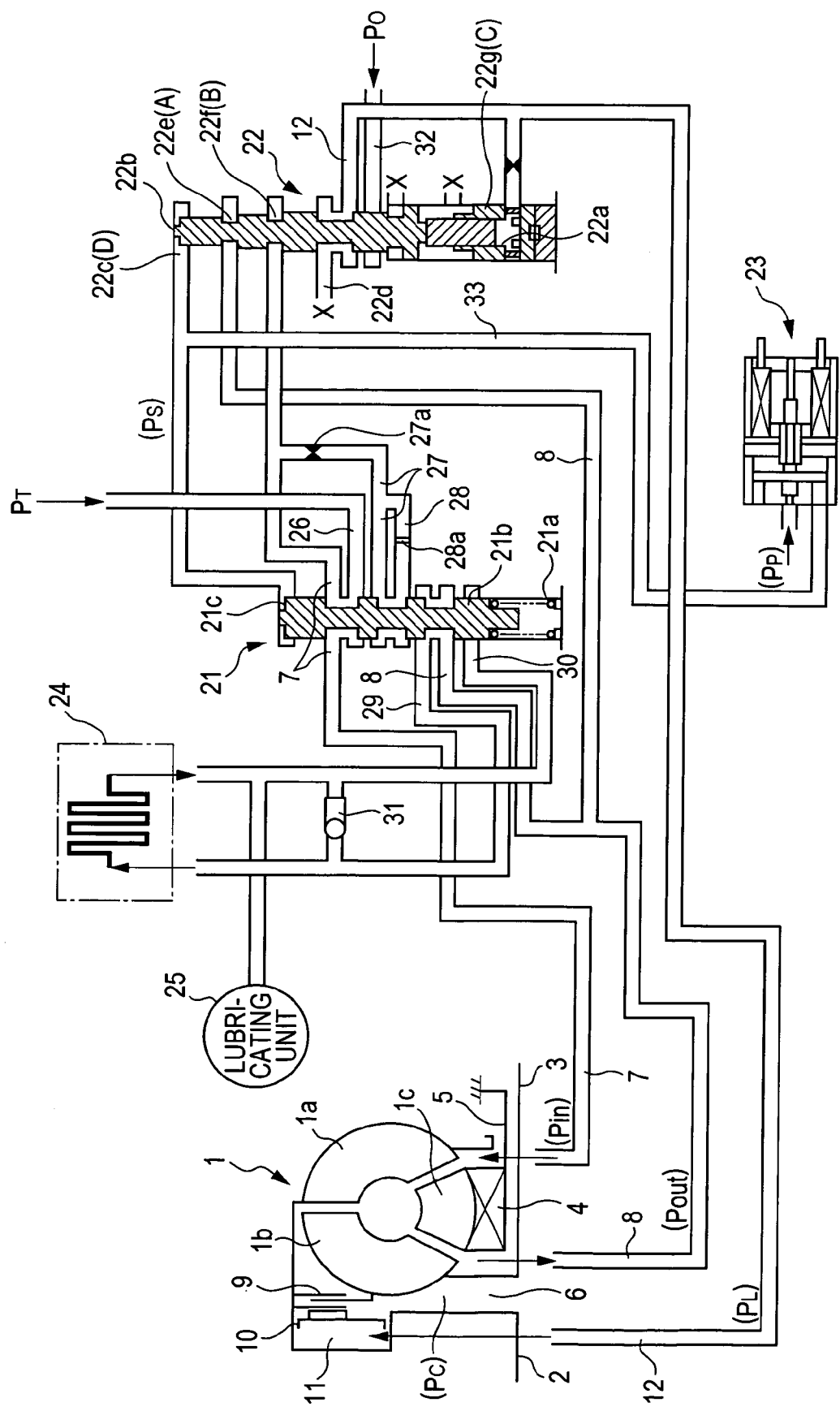
FIG. 8 is a hydraulic circuit diagram of a related lock-up controlling device.
Figure 9:
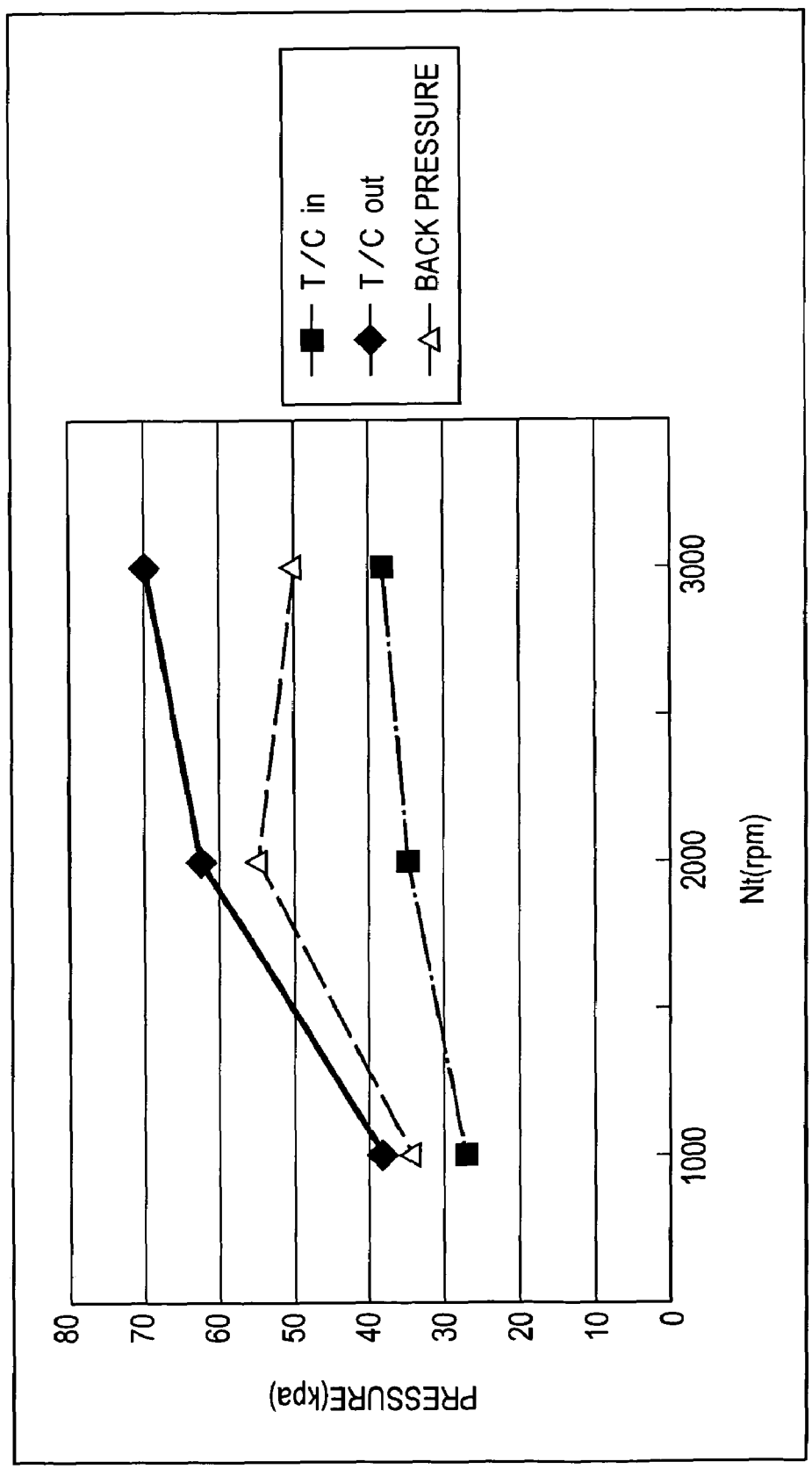
FIG. 9 is a graph showing the variations in the back pressure of a piston and the inlet pressure and the outlet pressure of a torque converter in terms of the rotational speed of a turbine.

FIG. 7 shows the waveform of the lock-up pressure that has been output by the application of the present invention. In the pre-charge control operation, it is possible to output a final lock-up pressure on the basis of the sum of the value corresponding to the back pressure of the piston, obtained from the back pressure map, and a predetermined pre-charge pressure value for output so that a remaining portion of a stroke of the piston becomes constant. In the subsequent shelf pressure control operation for absorbing device differences, it is also possible to output a final lock-up pressure on the basis of the sum of the value corresponding to the back pressure of the piston and a predetermined shelf pressure. In carrying out again the engagement control operation and continuous slip control after carrying out the feedback control operation that is carried out to perform the slip control to the target slip rotational speed and to perform the control of a certain amount of waiting time to the time of engagement, the value corresponding to the back pressure of the piston is used (added) in order to perform a controlling operation on the basis of an optimal lock-up pressure.

As is clear from FIG. 7, according to the invention, the responsiveness and the control precision of the piston are considerably increased in various cases of, for example, switching from the shelf pressure control state, the continuous slip control state, and the engagement control state to the slip control state. Therefore, for example, in the shelf pressure control state, the problem of shock being generated due to piston contact is prevented from occurring, so that the time lag until engine braking is realized can be minimized. In addition, when switching to the slip control state from the engagement control state, the switching to the slip control state from the engagement control state is quickly achieved, deterioration of the frictional members is reduced because the time lag between the time at which the engagement is started and the time at which the engagement is completed is minimized, and the slip amount during the speed change control is an optimum amount. These advantages are achieved because a precise value corresponding to the back pressure of the piston is reflected in the output lock-up pressure by making use of the back pressure map.

Due to the same reason, even when engagement is performed, the optimal lock-up pressure which can cancel the back pressure of the piston can be maintained, so that various advantages, such as a reduction in the load of an oil pump and an increase in fuel efficiency, can be achieved.

According to the present invention, as can be understood from the hydraulic circuit diagram exemplified in FIG. 4, oil paths for performing feedback of the inlet pressure and the outlet pressure of a torque converter to a lock-up pressure control valve in the related art are not required. Therefore, in addition to simplifying the oil path structure, problems arising from hysteresis resulting from the lock-up pressure in the related art are overcome.

Although the embodiment of the present invention is described, the present invention is not limited to the structure according to the aforementioned embodiment. For example, the present invention can be suitably applied to a lock-up clutch mechanism having a structure in which the back pressure of a piston acts in the direction of engagement of the clutch when an operation for increasing and reducing an equivalent amount of a specific pressure during clutch engagement and disengagement is performed.

What is claimed is:

1. A torque converter comprising:
   a pump vane wheel connected so as to be rotatable with an output shaft of an engine of a vehicle;

a turbine vane wheel connected so as to be rotatable with an input shaft of a transmission;

a stator vane wheel secured to a housing of the transmission via a one-way clutch;

a lock-up clutch mechanism which operates so as to control a slip amount of the turbine vane wheel and the pump vane wheel in accordance with a fluid pressure applied to a piston chamber of the lock-up clutch mechanism;

a hydraulic pressure map defining the relationship between a parameter which influences a back pressure of a lock-up piston of the lock-up clutch mechanism and the back pressure of the lock-up piston;

a sensor for measuring the parameter which influences the back pressure of the lock-up piston; and a lock-up pressure controlling unit for determining a value equivalent to the back pressure of the lock-up piston from the hydraulic pressure map and the parameter measured by the sensor and, the lock-up pressure controlling unit outputting a lock-up pressure to be applied to the piston chamber by compensating the value equivalent to the back pressure of the lock-up piston.

2. The torque converter according to claim 1, wherein the hydraulic pressure map comprises a three-dimensional map allowing the back pressure of the lock-up piston to be determined from a rotational speed of the engine, an oil temperature, and a speed ratio.

3. The torque converter according to claim 2, wherein a check valve is disposed at an oil path to the torque converter chamber.

4. The torque converter according to claim 2, wherein the lock-up clutch mechanism includes a coil spring for absorbing shock that is produced due to engagement of the lock-up clutch mechanism.

5. The torque converter according to claim 3, wherein the lock-up clutch mechanism includes a coil spring for absorbing shock that is produced due to engagement of the lock-up clutch mechanism.

6. The torque converter according to claim 1, wherein a check valve is disposed at an oil path to the torque converter chamber.

7. The torque converter according to claim 6, wherein the lock-up clutch mechanism includes a coil spring for absorbing shock that is produced due to engagement of the lock-up clutch mechanism.

8. The torque converter according to claim 1, wherein the lock-up clutch mechanism includes a coil spring for absorbing shock that is produced due to engagement of the lock-up clutch mechanism.

9. A torque converter comprising:

a pump vane wheel connected so as to be rotatable with an output shaft of an engine of a vehicle;

a turbine vane wheel connected so as to be rotatable with a member at a wheel side of the vehicle;

a stator vane wheel secured to a housing of a transmission via a one-way clutch;

a lock-up clutch mechanism which operates so as to control a slip amount of the turbine vane wheel and the pump vane wheel in accordance with a fluid pressure applied to a piston chamber of the lock-up mechanism;

a hydraulic pressure map defining the relationship between a parameter which influences a back pressure of a lock-up piston of the lock-up clutch mechanism and the back pressure of the lock-up piston;

a sensor for measuring the parameter which influences the back pressure of the lock-up piston;

a back pressure equivalent value calculating means for determining a value equivalent to the back pressure of the lock-up piston from the hydraulic pressure map and the parameter measured by the sensor;

a net transmission capacity calculating means for calculating a net transmission capacity in accordance with a running state of the vehicle; and a lock-up pressure controlling means for performing a control operation so that the sum of an output value of the back pressure equivalent value calculating means and an output value of the net transmission capacity calculating means is applied as a lock-up pressure to the piston chamber.

10. The torque converter according to claim 9, wherein the hydraulic pressure map comprises a three-dimensional map allowing the back pressure of the lock-up piston to be determined from a rotational speed of the engine, an oil temperature, and a speed ratio.

11. The torque converter according to claim 10, wherein a check valve is disposed at an oil path to the torque converter chamber.

12. The torque converter according to claim 10, wherein the lock-up clutch mechanism includes a coil spring for absorbing shock that is produced due to engagement of the lock-up clutch mechanism.

13. The torque converter according to claim 11, wherein the lock-up clutch mechanism includes a coil spring for absorbing shock that is produced due to engagement of the lock-up clutch mechanism.

14. The torque converter according to claim 9, wherein a check valve is disposed at an oil path to the torque converter chamber.

15. The torque converter according to claim 14, wherein the lock-up clutch mechanism includes a coil spring for absorbing shock that is produced due to engagement of the lock-up clutch mechanism.

16. The torque converter according to claim 9, wherein the lock-up clutch mechanism includes a coil spring for absorbing shock that is produced due to engagement of the lock-up clutch mechanism.

* * * * *